United States Patent
Dinca et al.

[19]

[11] Patent Number: 6,165,091
[45] Date of Patent: Dec. 26, 2000

[54] ROTARY HYDRAULIC AUTOMATIC TENSIONER

[75] Inventors: Flaviu V. Dinca, Richmond Hill; Daryl D. Musselman, Toronto; Larry J. Ferriman, Milton; Klaus K. Bytzek, Schomberg, all of Canada

[73] Assignee: Litens Automotive Partnership, Ontario, Canada

[21] Appl. No.: 09/199,557

[22] Filed: Nov. 25, 1998

Related U.S. Application Data

[60] Provisional application No. 60/066,473, Nov. 26, 1997.

[51] Int. Cl.[7] .............................. F16H 7/08; F16H 7/10; F16H 7/12
[52] U.S. Cl. ....................... 474/112; 474/101; 474/117; 474/135; 474/138
[58] Field of Search .......................... 474/101, 109–117, 474/133, 135, 138, 140; 188/290, 296, 307, 276, 310; 464/180

[56] References Cited

U.S. PATENT DOCUMENTS

| | | |
|---|---|---|
| 1,852,755 | 4/1932 | Peo . |
| 3,574,418 | 4/1971 | Okabe et al. . |
| 3,653,228 | 4/1972 | Tiberio . |
| 3,685,621 | 8/1972 | Gulick et al. . |
| 3,802,286 | 4/1974 | Winklhofer et al. . |
| 4,148,200 | 4/1979 | Schallhorn et al. . |
| 4,413,982 | 11/1983 | Foster . |
| 4,563,167 | 1/1986 | Foster . |
| 4,601,683 | 7/1986 | Foster . |
| 4,615,096 | 10/1986 | Foster . |
| 4,624,652 | 11/1986 | Foster ...................................... 474/135 |
| 4,634,408 | 1/1987 | Foster . |

(List continued on next page.)

FOREIGN PATENT DOCUMENTS

| | | |
|---|---|---|
| 0 300 858 | 1/1989 | European Pat. Off. .......... F16H 7/12 |
| 279415 | 11/1951 | France . |
| 1 157 144 | 5/1958 | France . |
| 290202 | 2/1916 | Germany . |
| 27 36 980 | 11/1978 | Germany . |
| 3829479 | 3/1989 | Germany . |
| 48-79975 | 10/1973 | Japan . |
| 2-72252 | 3/1990 | Japan ................................ F16H 7/12 |

OTHER PUBLICATIONS

PCT Invitation to Pay Additional Fees dated Apr. 15, 1999 re: corresponding application No. PCT/CA98/01068.

*Primary Examiner*—David A. Bucci
*Assistant Examiner*—Marcus Charles
*Attorney, Agent, or Firm*—Pillsbury Madison & Sutro LLP

[57] ABSTRACT

Disclosed is a tensioner for use in an engine. The tensioner comprises a fixed structure that fixes to the engine. A movable structure is mounted for movement relative to the fixed structure in a belt tensioning and opposite directions. A pulley member has a belt engaging surface that engages with the belt. One of the fixed and movable structures has an interior surface defining a fluid chamber containing fluid and the other includes a chamber dividing structure. The chamber dividing structure defines first and second chamber portions on opposing sides thereof. A biasing element biases the movable structure in the tensioning direction to tension the belt. Relative movement of the movable structure in the tensioning direction displaces fluid from the first to the second chamber portion and increases fluid pressure in the first chamber portion and decreases fluid pressure in the second chamber portion, and the reverse occurs during movement of the movable structure in the opposite direction. The chamber dividing structure allows the fluid to flow between the chamber portions in a restricted manner so as to yieldingly resist the relative movement of the movable structure and thereby dampen such movement. The chamber dividing structure is constructed such that the fluid flow restriction is greater when the movable structure moves in the opposite direction than in the tensioning direction, thereby providing the movable structure with greater resistance to movement in the opposite direction than in the tensioning direction.

48 Claims, 10 Drawing Sheets

U.S. PATENT DOCUMENTS

| | | |
|---|---|---|
| 4,708,697 | 11/1987 | Foster . |
| 4,721,495 | 1/1988 | Kan et al. . |
| 4,768,630 | 9/1988 | Aubry et al. .............................. 188/290 |
| 4,808,148 | 2/1989 | Holtz . |
| 4,832,665 | 5/1989 | Kadota et al. . |
| 4,923,435 | 5/1990 | Kadota et al. . |
| 5,052,982 | 10/1991 | Ouichi ..................................... 474/135 |
| 5,186,689 | 2/1993 | Yamamoto et al. . |
| 5,186,690 | 2/1993 | Yamamoto . |
| 5,366,417 | 11/1994 | Shimaya .................................. 474/112 |
| 5,558,587 | 9/1996 | Church .................................... 474/112 |
| 5,630,767 | 5/1997 | Hirabayashi et al. ................... 474/110 |
| 5,709,625 | 1/1998 | Nakakubo et al. . |
| 5,913,743 | 6/1999 | Ohta ........................................ 474/112 |

ROTARY HYDRAULIC AUTOMATIC TENSIONER

This application claims benefit of U.S. Provisional No. 60/066,473 filed Nov. 26, 1997.

FIELD OF THE INVENTION

The present invention relates to a driving element belt tensioner for use in a system driven by an endless driving element.

Automatic belt tensioners are used in driving element driven systems, such as timing belt drives in an automobile, to tension the driving element at an appropriate setting. Automatic belt tensioners minimize dynamic belt tension in order to achieve an increased belt life. These tensioners also control the belt tension level by automatically compensating for engine thermal expansion/contraction and for belt stretch and wear.

BACKGROUND AND SUMMARY OF THE INVENTION

Typically an automatic tensioner consists of a spring and a damper system. The spring is used to maintain a quasi-constant tension in the system, while the damper is used to reduce dynamic vibrations and to keep the pulley continuously in contact with the belt. If undamped, the tensioner would vibrate excessively under the dynamic influence of the engine.

Existing hydraulic tensioners can be divided into two groups: strut-type hydraulic tensioners and multi-disc viscous tensioners. Strut-type tensioners are less suitable because they have a very high unidirectional damping and the unit acts as a ratchet, pumping up the tensioner at resonance and causing increased dynamic belt tension. Also, these strut-type tensioners require a relatively large packaging space which is usually not available in the timing drive area of an engine. Multi-disc tensioners generate approximately the same damping level in both directions and thus are not able to continuously follow the driving element. In addition, both types of tensioners require a complicated installation procedure and are difficult to service after installation in the field.

U.S. Pat. No. 4,721,495 discloses an auto tensioner having an interior chamber filled with hydraulic fluid. The tensioner comprises a fixed portion and a displaceable portion pivotable relative to the fixed portion. Each of the fixed portion and the displaceable portion have a plurality of vanes extending into the fluid chamber. Relatively large clearances are provided between the ends of the vanes and the adjacent surface finding the fluid chamber. When increased or decreased tension in the belt causes the displaceable portion to move relative to the fixed portion, the vanes move relative to one another and cause the hydraulic fluid to flow through these clearances in a restricted manor, thereby damping movement of the displaceable portion.

One problem with the tensioner disclosed in the '495 patent is that the damping provided by the fluid is substantially the same in either direction of movement. Specifically, it will be noted that the vanes are provided symmetrically such that the fluid flow between the clearances thereof will be restricted in the same manner regardless of whether the displaceable portion is moving under an increased or decreased belt tension. In many situations it is desirable to have damping characteristics which are different in one direction than they are in the other. In particular, it is desired that the damping be greater in the belt tensioned direction than in the decreased belt tension direction. This arrangement helps prevent belts slippage which can be caused by belt becoming slack during decreased belt tension and the tensioner arm not moving quickly enough to apply the appropriate tensioning.

It is therefore an object of the present invention to provide a belt tensioner which provides different damping characteristics in opposed directions. In order to achieve this objective, the present invention provides a belt tensioner for use in an engine. The tensioner comprises a fixed structure constructed and arranged to be fixed to the engine. A movable structure is mounted for movement relative to the fixed structure in a belt tensioning direction and an opposite direction. A pulley member is rotatably mounted on the movable structure. The pulley member has a belt engaging surface positioned and configured to be engaged with the endless belt such that movement of the belt rotates the pulley member. One of the fixed structure and the movable structure has an interior surface defining a fluid chamber containing substantially incompressible fluid. The other of the fixed structure and the movable structure includes a chamber dividing structure disposed within the fluid chamber. The chamber dividing structure cooperates with the interior surface defining the fluid chamber so as to define first and second chamber portions within the fluid chamber on opposing sides of the chamber dividing structure.

A biasing element is engaged with the movable structure. The biasing element applies a biasing force to bias the movable structure in the tensioning direction to tension the belt. The chamber dividing structure is constructed and arranged such that the relative movement of the movable structure in the tensioning direction displaces fluid from the first chamber portion to the second chamber portion and increases fluid pressure in the first chamber portion and decreases fluid pressure in the second chamber portion, and relative movement of the movable structure in the opposite direction displaces fluid from the second chamber portion to the first chamber portion and increases fluid pressure in the second chamber portion and decreases fluid pressure in the first chamber portion. The chamber dividing structure being configured to allow the fluid to flow between the chamber portions in a restricted manner so as to yieldingly resist the relative movement of the movable structure and thereby dampen the relative movement of the movable structure. The chamber dividing structure is constructed and arranged such that the fluid flow restriction is greater when the movable structure moves in the opposite direction than when the movable structure moves in the tensioning direction, thereby providing the movable structure with greater resistance to movement in the opposite direction than in the tensioning direction.

Preferably, the aforesaid one of the fixed and moveable structures is the moveable structure and the other of the fixed and moveable structures is the fixed structure. It can be appreciated that the tensioner constructed in accordance with this aspect of the present invention provides different dampen characteristics in opposing directions. The characteristics can be selected for particular applications.

In order to provide the restricted flow, a plurality of passageways may be formed through the dividing structure and a plurality of flapper plates be positioned so as to close the passageways. A number of the flapper plates are disposed on one side of the dividing structure and the remainder are disposed on the other side of the dividing structure.

Another problem with the tensioner of the '495 patent is that it has no way of compensating for increased fluid pressure due to increased operating temperatures. With the tensioner mounted to the engine during operation, the engine gives off a substantial amount of heat, which in turn elevates the fluid temperature and accordingly increases fluid pressure. This increased pressure can have an adverse effect on tensioner performance.

Therefore, it is another object of the present invention to provide a belt tensioner which is adapted to compensate for increased fluid temperature and the resultant fluid pressure increase. In order to achieve this object, another aspect of the present invention provides a belt tensioner for use in an engine. The tensioner comprises a fixed structure constructed and arranged to be fixed to the engine. A movable structure is mounted for movement relative to the fixed structure in a tensioning direction and an opposite direction. A pulley member is rotatably mounted on the movable structure. The pulley member has a belt engaging surface positioned and configured to be engaged with the belt such that movement of the belt rotates the pulley member. One of the fixed structure and the movable structure has an interior surface defining a fluid chamber containing substantially incompressible fluid. The other of the fixed structure and the movable structure includes a chamber dividing structure disposed within the fluid chamber. The chamber dividing structure cooperates with the interior surface defining the fluid chamber so as to define a first and second chamber portions within the fluid chamber on opposing sides of the chamber dividing structure.

A biasing element is engaged with the movable structure. The biasing element applies a biasing force to bias the movable structure in the tensioning direction so as to tension the belt. The chamber dividing structure is constructed and arranged such that the relative movement of the movable structure in the tensioning direction displaces fluid from the first chamber portion to the second chamber portion and increases fluid pressure in the first chamber portion and decreases fluid pressure in the second chamber portion, and relative movement of the movable structure in the opposite direction displaces fluid from the second chamber portion to the first chamber portion and increases fluid pressure in the second chamber portion and decreases fluid pressure in the first chamber portion. The chamber dividing structure is configured to allow the fluid to flow between the chamber portions in a restricted manner so as to yieldingly resist the relative movement of the movable structure and thereby dampen the relative movement of the movable structure.

A surface defines a volume compensation chamber communicated to the fluid chamber. A resiliently compressible structure is disposed inside the compensation chamber. The compressible structure and the compensation chamber are positioned and configured such that the substantially incompressible fluid can flow from the fluid chamber to the compensation chamber when the fluid pressure in the chamber increases as a result of increased temperature such that the fluid compresses the resiliently compressible structure so as to volumetrically expand the compensation chamber and compensate for the increased fluid pressure.

Other objects, features, and advantages of the present invention will be initiated from the following detailed description, the accompanying drawings, and the appended claims.

DETAILED DESCRIPTION OF THE PREFERRED EMBODIMENT ILLUSTRATED IN THE DRAWINGS

Figure 1:
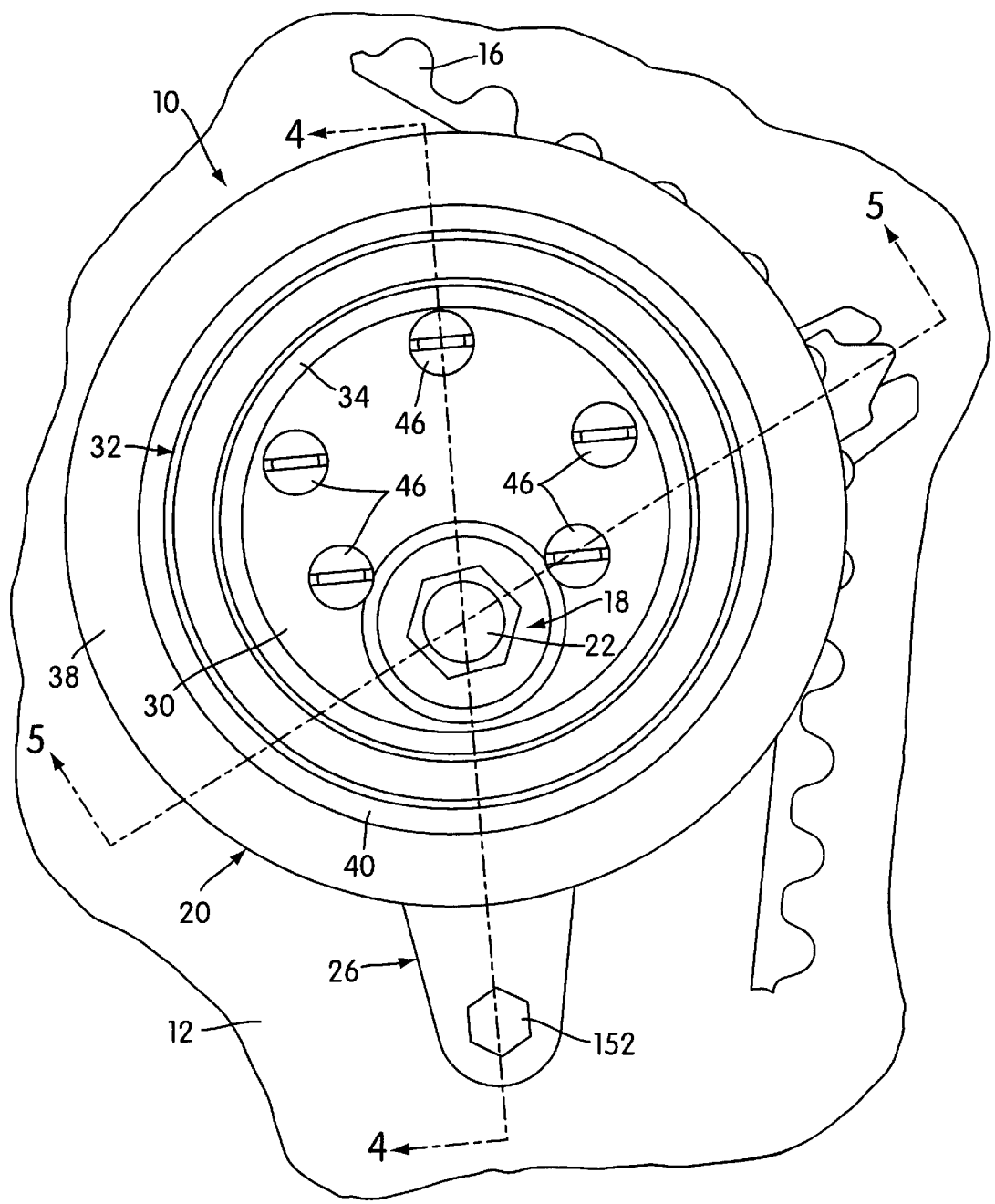
FIG. 1 is a front plan view of a hydraulic belt tensioner shown mounted on a vehicle engine and disposed in tensioning engagement with a timing belt in accordance with the principles of the present invention.

FIG. 1 shows a hydraulic belt tensioner, generally indicated at 10, constructed in accordance with the principles of the present invention. The tensioner 10 is shown mounted on a motor vehicle engine mounting surface 12 and disposed in tensioning engagement with an endless timing belt 16.

The tensioner 10 comprises a fixed structure, generally indicated at 18, and a movable structure in the form of a pivoted structure, generally indicated at 20. The fixed structure 18 includes a mounting bolt 22, which mounts the entire tensioner 10 onto the engine mounting surface 12. As will be appreciated from the exploded view shown in FIG. 2, the fixed structure 18 may be considered to further include a valve assembly 24, as will be described in greater detail later. The fixed structure 18 may further be considered to include a base plate member 26, as will also be described later in greater detail.

Referring back to FIG. 1, it can be appreciated that the pivoted structure 20 includes an eccentric tensioner arm 30 mounted for pivotal movement with respect to mounting bolt 22. The pivoted structure 20 further includes a pulley member 38 mounted for rotational movement on the eccentric tensioner arm 30. In particular, the pulley member 38 is mounted on a ball bearing assembly 32 having the outer race 40 thereof press-fit to the inner cylindrical surface 39 (see FIG. 4) of the pulley member 38. The inner race 34 of the ball bearing assembly is fit onto an exterior cylindrical surface 36 (see FIG. 2) of eccentric tensioner arm 30.

Figure 2:
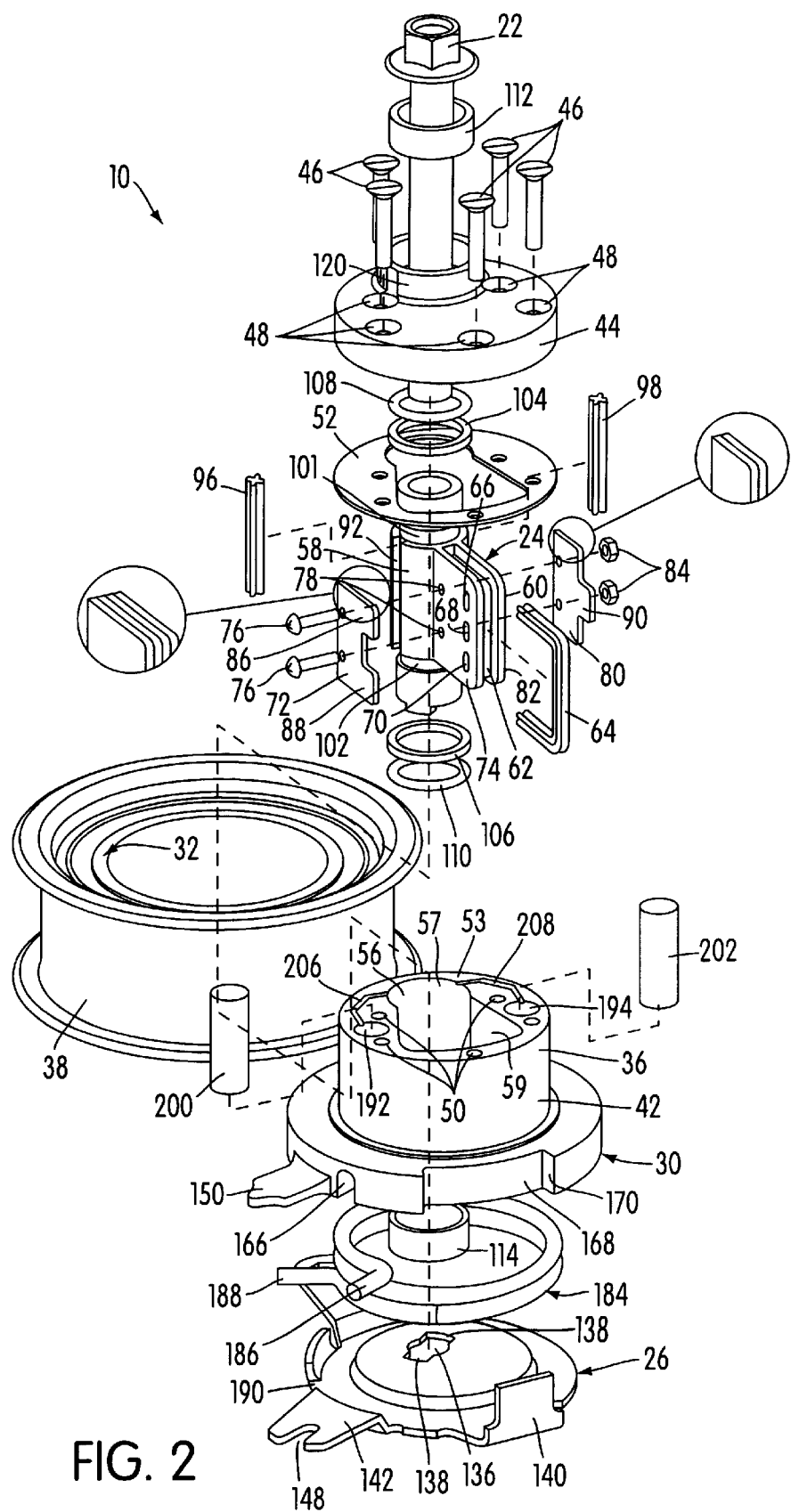
FIG. 2 is an exploded view of the belt tensioner illustrated in FIG. 1.

As better shown in FIG. 2, the eccentric tensioner arm 30 includes a main housing portion 42 and a housing closure portion 44. The closure portion 44 is fastened to the main housing portion 42 by a plurality of appropriate fastening members 46. In particular, fastening members 46 pass through openings 48 in closure portion 44 and are received in threaded bores 50 in the main housing portion 42 to secure the portions 42, 44 to one another. A sealing gasket 52, preferably made of a rubber material, is sandwiched between the end surface 53 of the main housing portion 42 and the opposite facing surface 55 of housing closure portion 44 (see FIG. 3) so as to form a seal therebetween. An O-ring (not shown) may be used in place of the gasket 52 to provide the seal. It is contemplated that rather than providing the fastening members 46 within bores 50, the housing portions 42 and 44 can be welded or glued to one another. In such an arrangement, the sealing gasket can be omitted.

Figure 3:
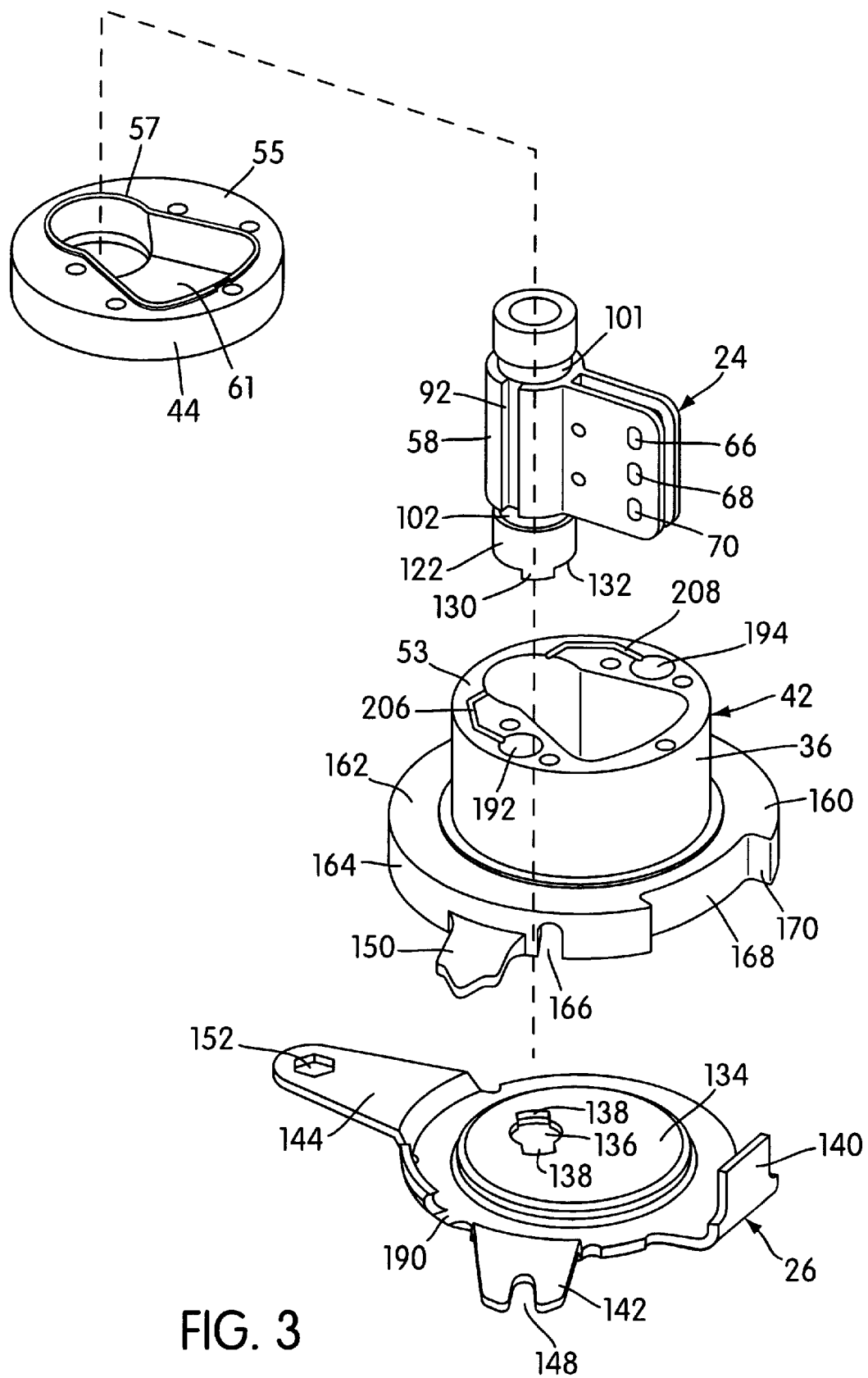
FIG. 3 is an exploded view similar to that illustrated in FIG. 2, but with various component parts removed to better illustrate others, and showing the closure housing portion being inverted relative to its orientation in FIG. 2.

As can also be seen in FIG. 3, the surface 55 is provided with a peripheral projecting ridge 57 surrounding the upper portion 61 of the main chamber 56. The ridge 57 is constructed and arranged to sealingly engage the facing end surface 53 of the main housing portion 42 so as to help seal the hydraulic fluid within the main chamber 56 at the interface between the housing portions 42 and 44.

When the main housing portion 42 and closure housing portion 44 are sealingly secured to one another, they define a main chamber 56 constructed and arranged to sealingly contain a viscous hydraulic fluid, preferably a silicone fluid. The main chamber 56 includes a generally cylindrical portion 57 constructed and arranged to receive the mounting bolt 22 and a generally sector shaped portion 59.

The vane assembly 24 includes a cylindrical, tubular portion 58, and a vane structure 60 extending radially outwardly from one circumferential portion of the cylindrical tubular portion 58. The vane structure 60 has a generally rectangular configuration and is integrally formed from metal (preferably aluminum or steel) with the cylindrical tubular portion 58. The tubular cylindrical portion 58 is disposed in cylindrical chamber portion 57 and the vane structure 60 is disposed in the sector shaped chamber portion 59. The vane structure 60 has a thickness sufficient to accommodate a peripheral groove 62 that is constructed and arranged to receive a resilient (preferably rubber) sealing member 64.

It is contemplated that seal member 64 and groove 62 may be omitted if a sufficiently small clearance is provided between the periphery of vane structure 60 and the adjacent surfaces defining chamber 56 to provide an adequate sealing function. The vane seal structure 60 has a plurality, preferably three, fluid passageways 66, 68 and 70 extending through its thickness. The fluid passageways 66, 68, and 70 are preferably conically shaped.

A rebound damping flapper plate 72 is fixed to one side 74 of the vane structure 60 by a plurality of fasteners 76 extending through holes 78 in the vane structure 60. A bump damping flapper plate 80 is fixed to a second side 82 of the vane structure 60 by the fasteners 76 extending through the holes 78. Fasteners 76 are secured to respective nuts 84 on the opposite side of the vane structure 60. The nuts 84 receive the threaded ends of fasteners 76. The fasteners 76 seal the openings 78 through which they extend, so that the hydraulic fluid does not pass through said openings 78. It is contemplated that plates 72 and 80 could be spin riveted or otherwise affixed to the vane 24 by incorporating proud staking features in the place of holes 78. Plates 72 and 80 are preferably made from a metal material which is sufficiently thin to permit flexing under sufficient pressure as will be described later.

As shown, the rebounding damping flapper plate 72 has upper and lower projections 86 and 88 respectively. The upper projection 86 covers and closes the upper passageway 66 on the one side 74 of the vane structure 60, and a lower projection 88 covers the lower passageway 70 on the same side 74 of the vane structure 60. The bump damping flapper plate 80 has a single projection 90 which covers and closes the central passageway 68 on the opposite side 82 of the vane structure 60.

Figure 6A:
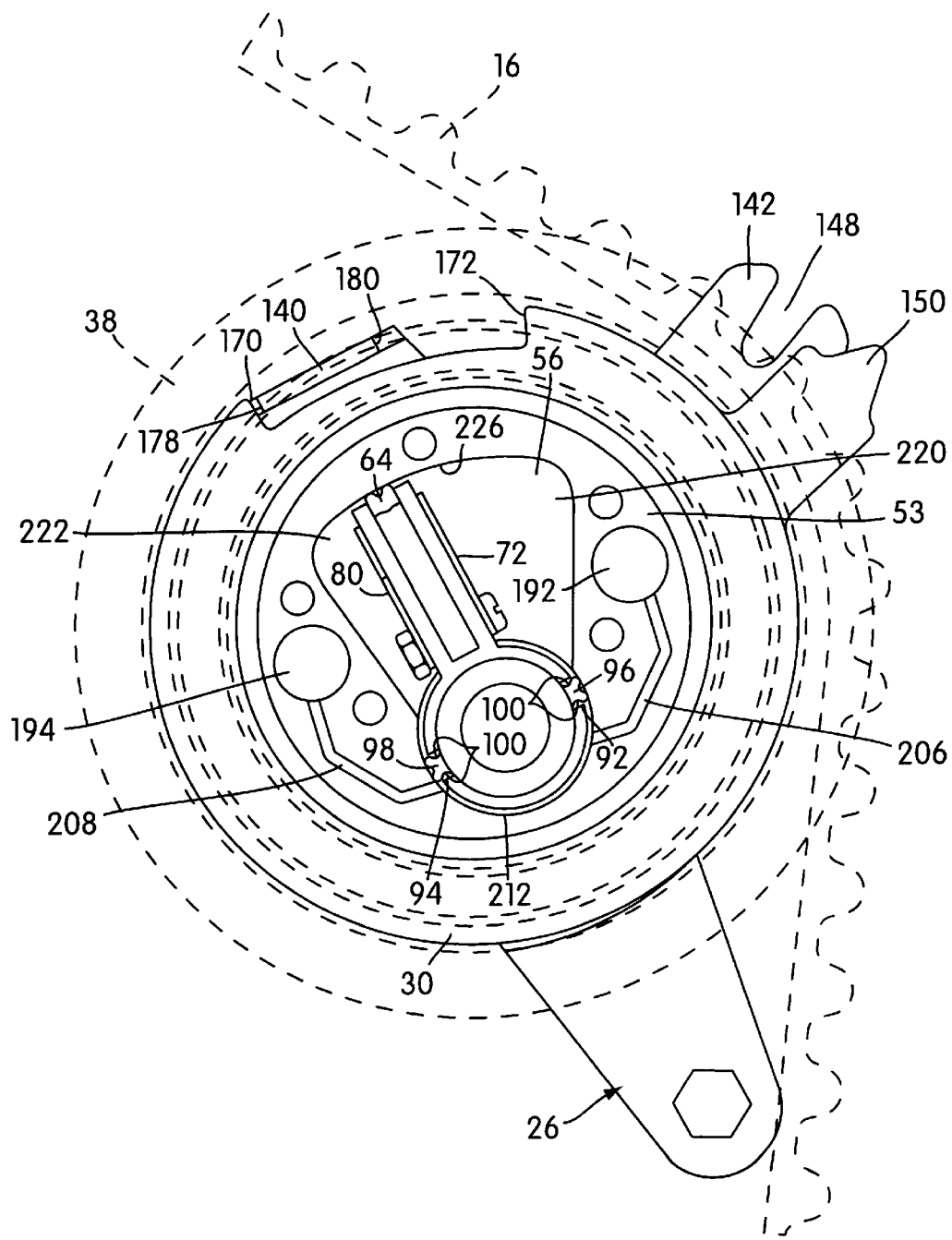
FIG. 6A is a front plan view of the belt tensioner prior to installation, with various components removed to better reveal others.

The cylindrical tubular portion 58 of the valve assembly 24 has a pair of axially extending longitudinal grooves 92 and 94 disposed on opposite sides of the cylindrical tubular portion 58, circumferentially spaced approximately 180° from one another and approximately 90° from the central groove 62 formed in the vane structure 60. The grooves 92 and 94 are constructed and arranged to receive resilient sealing members 96 and 98 respectively. It is contemplated that the grooves 92 and 94 could equally well be removed from the vane surface 58 and located on the lower housing 53 so as to affect a dynamic seal on the vane surface 58. The sealing members 64, 96 and 98 are made from a resilient, preferably rubber based material, and are of the quad seal type, which is hydraulically charged (i.e., it works better under pressure) as a result of the U-shaped grooves 99 in sealing member 64 and U-shaped grooves 100 in sealing members 96 and 98 facing the associated pressure regions, as shown in FIG. 6A.

Referring back to FIGS. 2 and 3, it can be appreciated that the cylindrical tubular portion 58 of the valve assembly 24 has an upper annular groove 101 and a lower annular groove 102. These can be more easily seen in the cross-sectional views of FIGS. 4 and 5. The grooves 101 and 102 are constructed and arranged to receive respective teflon (PTFE) sealing rings 104 and 106, respectively. The sealing rings 104 and 106 form an annular seal between the cylindrical tubular portion 58 of the valve assembly 24 and adjacent regions of the housing portions 44 and 42 so as to maintain the hydraulic (silicone) fluid within the chamber 56 defined by the housing portions 42 and 44. The sealing rings 104 and 106 also act as thrust washers to limit axial motion of the vane relative to the housing 53. O-ring members 108 and 110 are also respectively received within the grooves 101 and 102 to further prevent any leakage of silicone fluid to the external environment.

It is contemplated by the present invention that the upper sealing ring 104 could be combined with the O-ring member 108 into an integrally formed, unitary sealing structure. Similarly, the lower sealing ring 106 could be combined with the O-ring member 110 to form an integral, unitary sealing structure.

Figure 4:
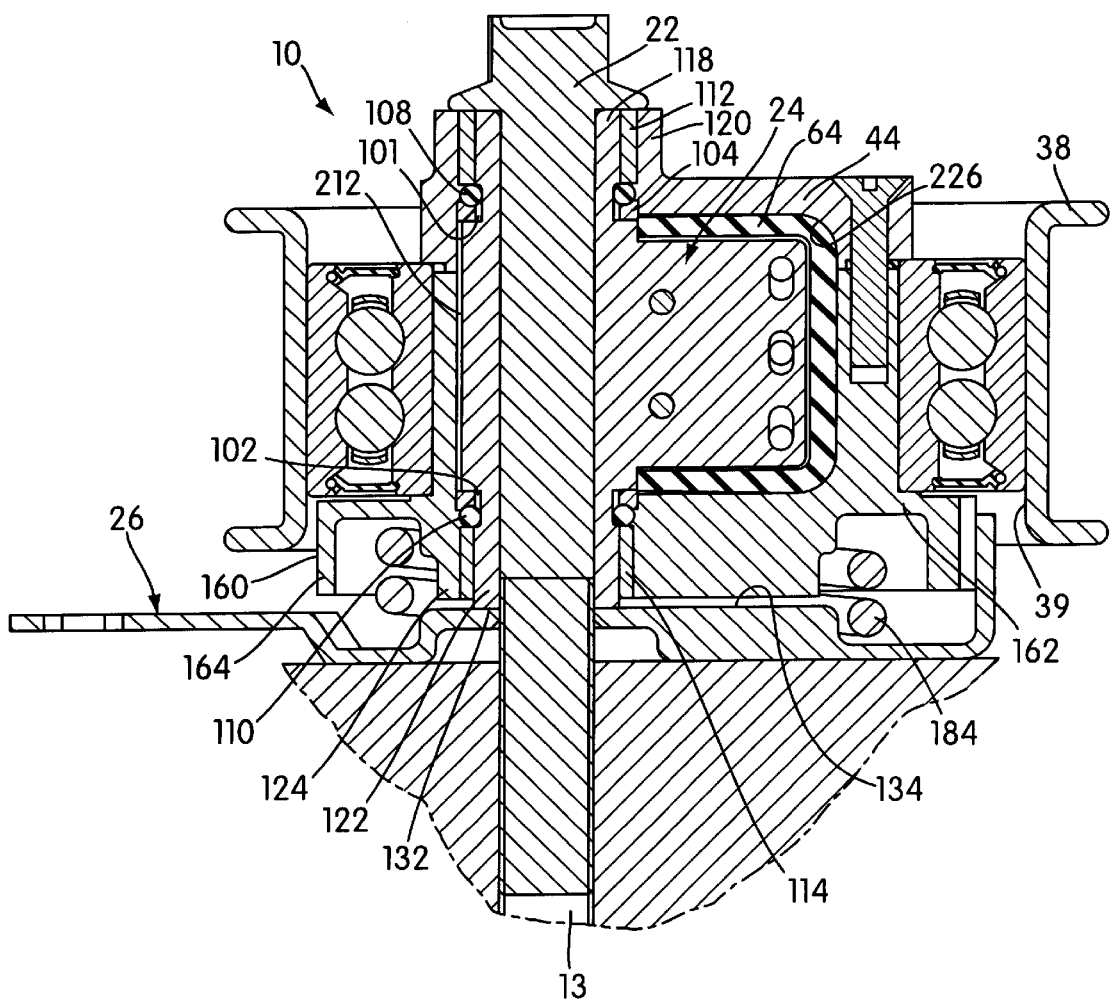
FIG. 4 is a cross-sectional view taken through the line of 4—4 in FIG. 1.
Figure 5:
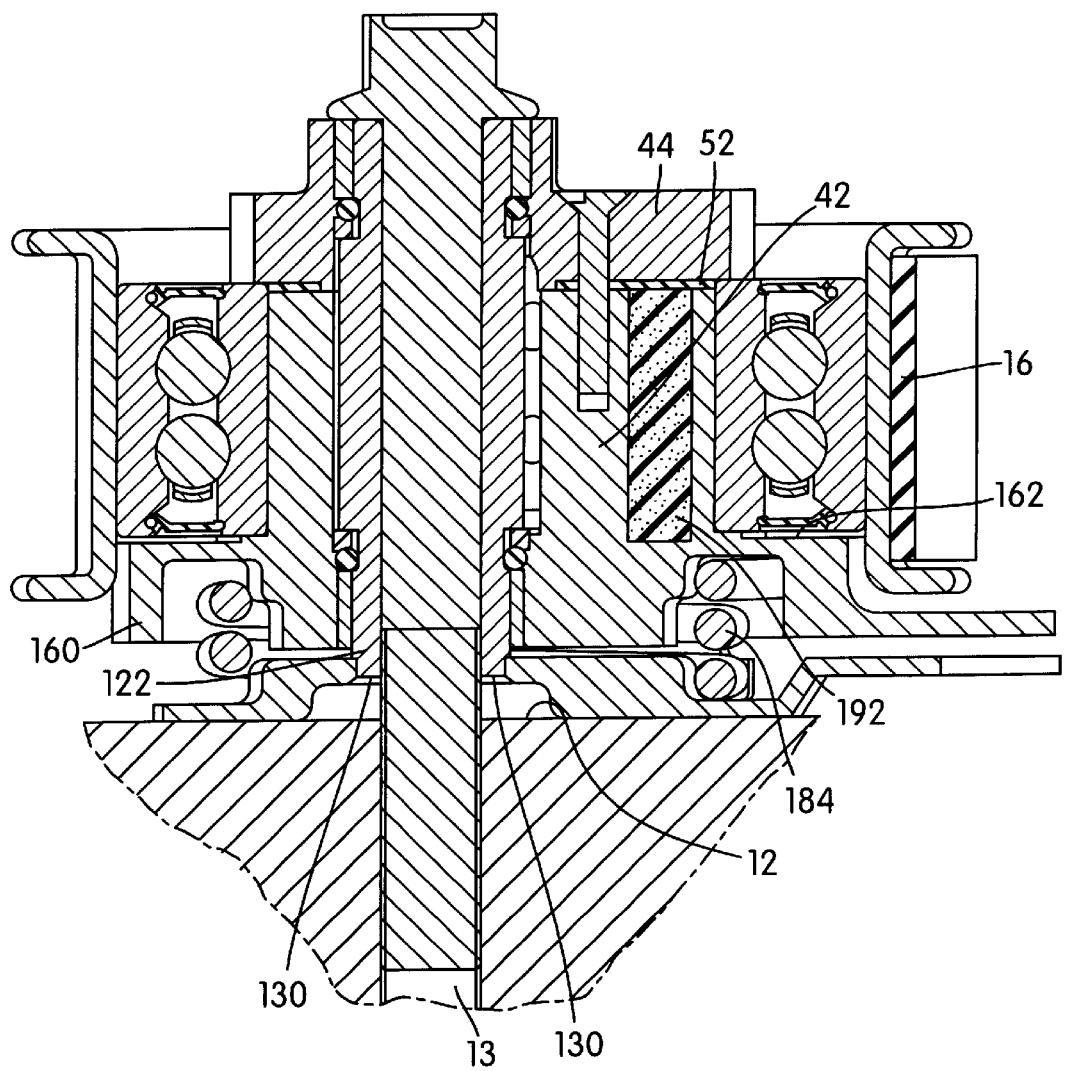
FIG. 5 is a cross-sectional view taken through the line of 5—5 in FIG. 1.

An upper journal bearing 112 and a lower journal bearing 114 are tubular in form and have a generally cylindrical configuration. The journal bearings 112, 114 are made of a metallic material which provides friction sliding bearing surfaces. As best seen in FIGS. 4 and 5, the upper journal bearing 112 is disposed between an upper end portion 118 of the cylindrical tubular portion 58 and an upper cylindrical wall portion 120 of the closure housing portion 44. Similarly, the opposite journal bearing 114 is disposed between a cylindrical end portion 122 of the cylindrical tubular portion 58 and adjacent regions 124 of the main housing portion 42. The journal bearings 112 and 114 permit the eccentric tensioner arm 30 to pivotally move about the cylindrical tubular portion 58, which remains fixed during tensioner operation.

As can also be appreciated from FIGS. 2, 3, and 5, the end portion 122 of the cylindrical tubular portion 58 has a pair of circumferentially spaced tabs 130, axially extending from a terminal edge 132 of the end portion 122. The tabs 130 are disposed on opposite sides of the cylindrical tubular portion 58 and separated by approximately 180°. Arcuate portions of terminal edge 132 between tabs 130 are constructed and arranged to engage the facing surface 134 of the base plate 26 at areas surrounding a circular portion of a hole 136 in the base plate 26. The tabs 130 are received in opposite extension portions 138 of the hole 136. The disposition of the tabs 130 within the extension portions 138 in the base plate 26 provide assurance that the valve assembly 24 remains fixed from rotation about the fixing bolt 22, as the tabs 130 prevent relative rotational movement between the base plate 26 and the valve assembly 24.

It is also contemplated that other structures may be used in place of the tabs 130. For example, a base insert (not shown) may be press-fit into the base plate 26 and the tubular portion 58 can be press-fit into the base insert.

As best illustrated in FIG. 3, the base plate 26 has a stop member 140, an indicator member 142, and installation member 144 extending radially outwardly at circumferentially spaced locations from the generally outer circular perimeter of the base plate 26. The indicator member 142 has a notch 148 that is used to be aligned with a pointer member 150 of the eccentric tensioner arm 30. The pointer 150 extends radially outwardly from a peripheral skirt 160 of the main housing portion 42 and indicates proper static tensioning engagement of the tensioner with the belt 16 during installation when the pointer 150 is aligned with notch 148 of indicator 142. The installation member 144 has a hexagonal opening 152 constructed and arranged to receive an installation tool which is used to rotate the base plate 26 in pivotal relation about the mounting bolt 22 during installation so as to bring the tensioner 10 into proper tensioning engagement with the belt 16.

Figure 7:
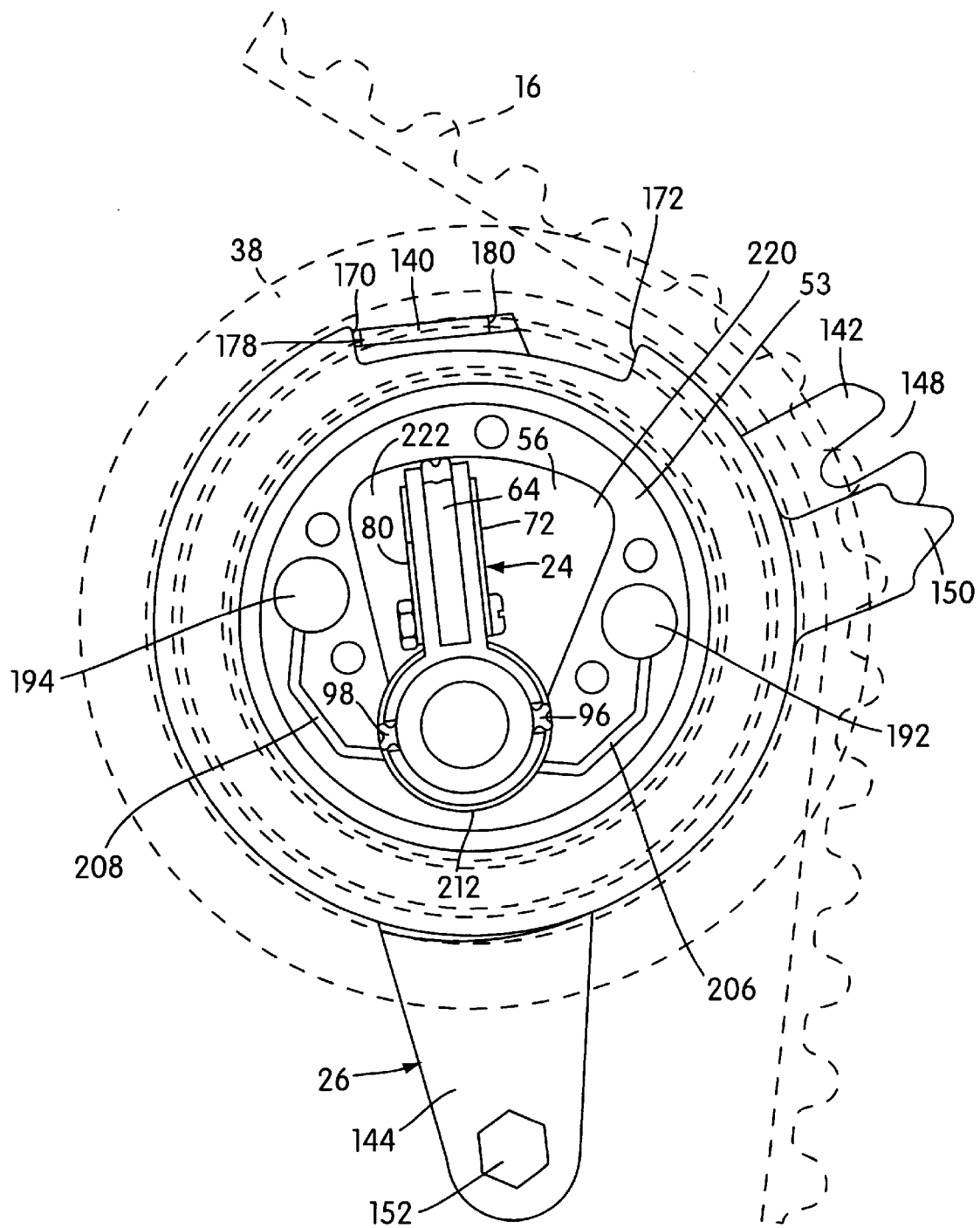
FIG. 7 is a front plan view similar to that illustrated in FIG. 6B, but showing the eccentric arm disposed at a first limit position in which the arm is engaging an end stop.
Figure 8:
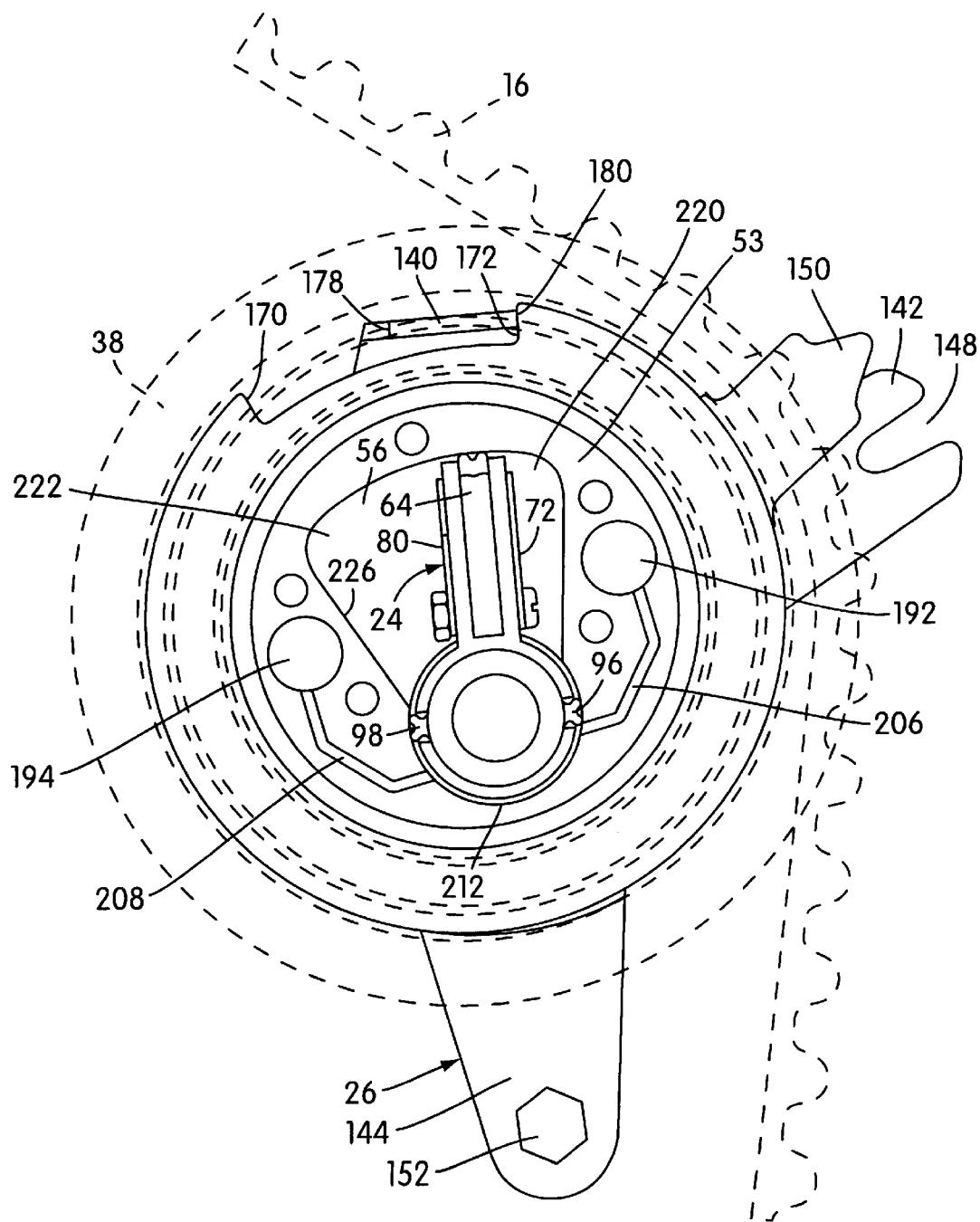
FIG. 8 is a front plan view similar to that illustrated in FIG. 7, but showing the arm in a second limit position in which it engages a second end stop.
Figure 9:
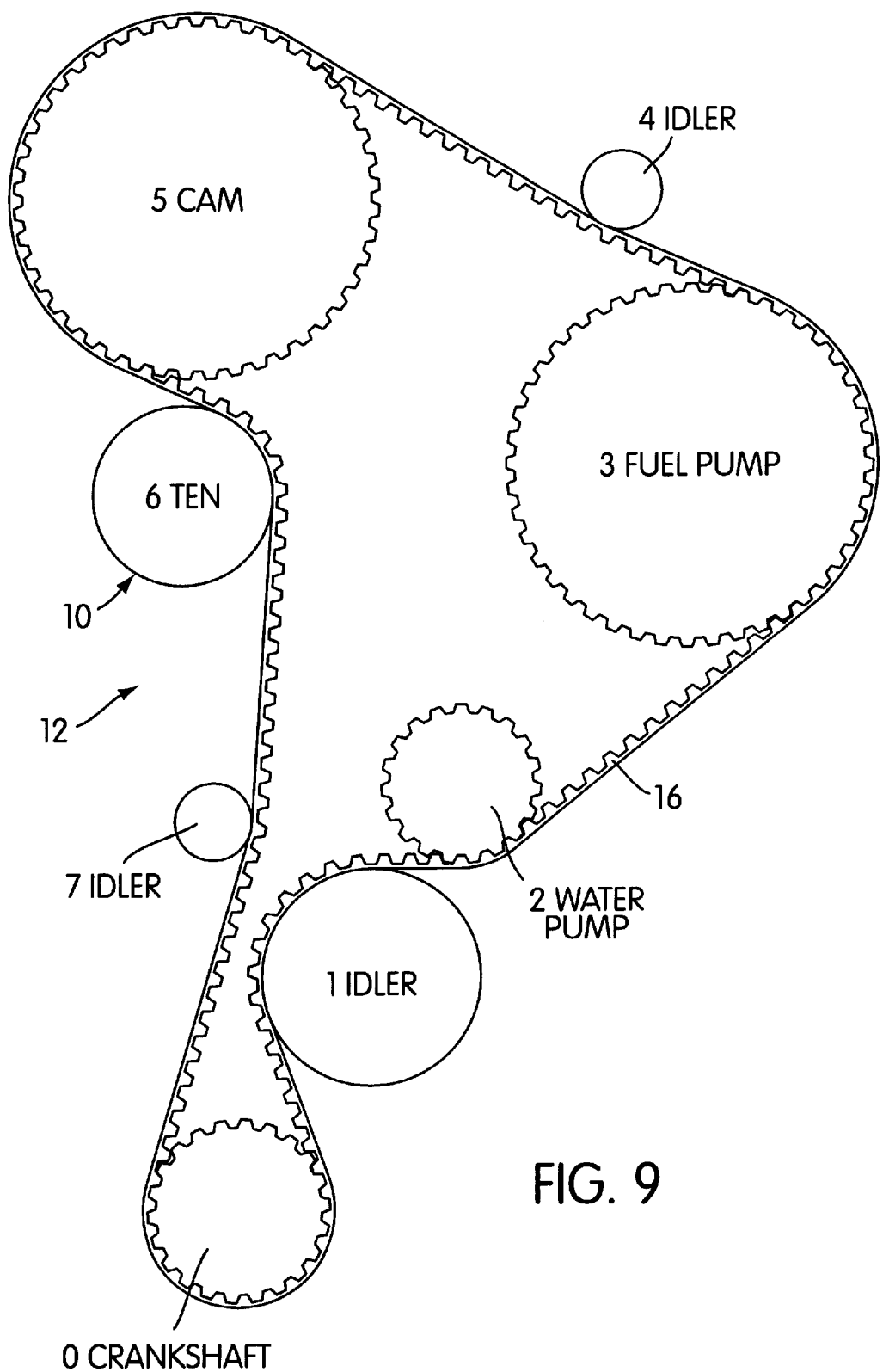
FIG. 9 is a schematic view of a motor vehicle engine incorporating a timing belt system including crankshaft, cam pulley, fuel pump pulley, water pump pulley, a plurality of idler pulleys, and the tensioner in accordance with the invention.

The lower peripheral skirt 160 of the main housing portion 42 of the eccentric tensioner arm 30 is integrally formed with the rest of housing portion 42 and has a diameter which is greater than the exterior surface 36 surrounding chamber 56. As shown in FIG. 3, the skirt 160 includes a radially outwardly extending annular wall portion 162, and an axially extending cylindrical wall portion 164 formed at the radially outer periphery of the wall portion 162. As shown in FIG. 3, the radially outwardly extending indicator projection 150 extends radially outwardly from the cylindrical wall portion 164. As also shown in FIG. 3, the cylindrical wall portion 164 has a notch or cut-out portion 166 formed therein at a position adjacent to the pointer 150. In addition, the cylindrical wall portion 164 has a recessed portion 168 formed therein. Recessed portion 168 is defined on opposite sides thereof by radially extending surfaces 170 and 172. As can be appreciated from FIGS. 6–8, the surfaces 170 and 172 of the eccentric tensioner arm 30 are moved into engagement with the respective facing edges 178 and 180 of the stop member 140 of base plate 26 so as to limit the first and second positions of the pivoted structure 20 toward and away from the belt 16.

Referring to FIGS. 2, 4, and 5, it can be seen that a torsion spring 184 is connected between the base plate 26 and the eccentric tensioner arm 30. In particular, one end of the torsion spring 184 has a first radially extending tang 186 which is received within the notch 166 of the main housing portion 42 of the tensioner arm 30, and an opposite end of the torsion spring 184 has a second radially extending tang 188. The second radially extending tang 188 is received within a notch 190 in the base plate 26. When the tensioner 10 is installed on an engine mounting surface 12, the torsion spring 184 is constructed and arranged to bias the eccentric tensioner arm 30, and thus the entire pivotal structure 20, in a pivotal direction with respect to the fixed structure 18 in tensioning engagement with the timing belt 16. For example, in FIG. 1, the eccentric tensioner arm 30 and entire pivotal structure 20 is biased for pivotal movement in a clockwise direction with respect to the fixed structure 18.

As best illustrated in FIG. 2, in addition to the main chamber 56, the main housing portion 42 defines two separate volume compensation chambers 192 and 194. The chambers 192 and 194 are substantially cylindrical in shape as defined by respective cylindrical surfaces. The chambers 192 and 194 are constructed and arranged to receive resiliently compressible structures in the form of cylindrically shaped compressible closed cell foam members 200 and 202, respectively. As can be appreciated from FIG. 5, the chambers 192 and 194 are closed off by the metal material for forming the housing portion 42 adjacent to the radially outwardly extending surface 162. As can also be appreciated from FIG. 5, the upper end of the chambers 192 and 194 are substantially sealed by the gasket 52. However, as can be appreciated from FIGS. 2 and 3, a pair of shallow grooves 206 and 208 are carved in the end surface 53 of the main housing portion 42. Grooves 206 and 208 connect the chambers 192 and 194, respectively, to a lower pressure area 212 of the main chamber 56 (see FIGS. 4–8). The low pressure area 212 is formed by the cylindrical tubular portion 58 at an area thereof between seals 96 and 98 opposite the side of the tubular portion 58 from which the vane structure 60 extends, the adjacent surface of chamber 56, and sealing rings 104, 106. The grooves 206 and 208 at all times communicate the compensation chambers 192 and 194, respectively, with the low pressure area 212 of the chamber 56. As can be appreciated from FIGS. 6–8, the shaft seals 96 and 98 seal the low pressure area 212 from other portions of the main chamber 56, but permits some leakage over time as will be described.

The installation and operation of the tensioner will now be described. As a first step in installation, the tensioner 10 is mounted on the engine mounting surface 12, with the mounting bolt 22 loosely threaded into a hole 13 within the engine mounting surface 12. With the tensioner 10 loosely mounted on the engine mounting surface 12, the timing belt 16 is trained loosely about the pulley member 38. In this loosely installed configuration, the eccentric tensioner arm 30, base plate 26, and valve assembly 24 assume the relative positions illustrated in FIG. 7. The valve assembly 24 and base plate 26 are fixed relative to one another, and the torsion spring 184 biases the eccentric arm 30 in a clockwise direction with respect to the mounting bolt 22, cylindrical tubular portion 58 of the valve assembly 24, and the entire base plate 26 as viewed in the configuration of FIG. 7. The clockwise pivotal movement and position of the arm 30 relative to the bolt 22 and base plate 26 is limited by the engagement of stop surface 170 of the arm 30 with the facing edge 178 of the stop member 140 of the base plate. With the bolt 22 continuing to be loose within the hole 13, an installation tool is inserted into the hexagonal hole 152 in the installation member 44. The installation tool is rotated in a clockwise direction around the mounting bolts 22 so as to rotate the base plate 26 clockwise. The pulley member 38 mounted on the exterior surface 36 of the eccentric tensioner arm 30 is moved into tensioning engagement with the timing belt 16 as a result of the fact that it is eccentrically disposed with respect to the mounting bolt 22 by virtue of the eccentric arm 30. As the base plate 26 and valve assembly 24 continue to be rotated in a clockwise direction, the pulley 38 increases the tensioning force applied to the timing belt 16. Eventually, the opposing belt load force applied by the timing belt 16 to the pulley member 38 becomes sufficiently great so that the additional torque applied through the arm 30 upon further clockwise rotation of the base plate 26 causes relative rotational or pivotal movement between the arm 30 and a base plate 26 against the biasing force of the torsion spring 184. More particularly, as the opposing belt load force becomes sufficiently great to overcome the bias of spring 184, the arm 30 substantially stops moving about the installation bolt 22 in unison with the base plate 26. The rotation of the base plate 26 is continued by the operator against the force of torsion spring 184 until the notch 148 in the indicator member 142 is brought into alignment with the projecting indicator 150 on the eccentric tensioner arm 30. This position can be appreciated from FIG. 6B. In this configuration, the stop member 140 is approximately midway between the stop surfaces 170 and 172 of the eccentric tensioner arm 30, and the vane structure 60 is approximately at a mid point within the chamber 56. At this position, the tensioner applies a predetermined static tensioning force to the timing belt 16. With the tensioner in this position, the mounting bolt 22 is tightened. As can be appreciated from the cross-sectional views of FIGS. 4 and 5, this tightening action applies an axial force to the valve assembly 24 and base plate 26 so as to clamp these members into fixed relation on the engine mounting surface 12. As a result, the tensioner 10 is disposed in predetermined static tensioning engagement with the timing belt 16 under the force of torsion spring 184, as the position illustrated in FIG. 6B.

Figure 6B:
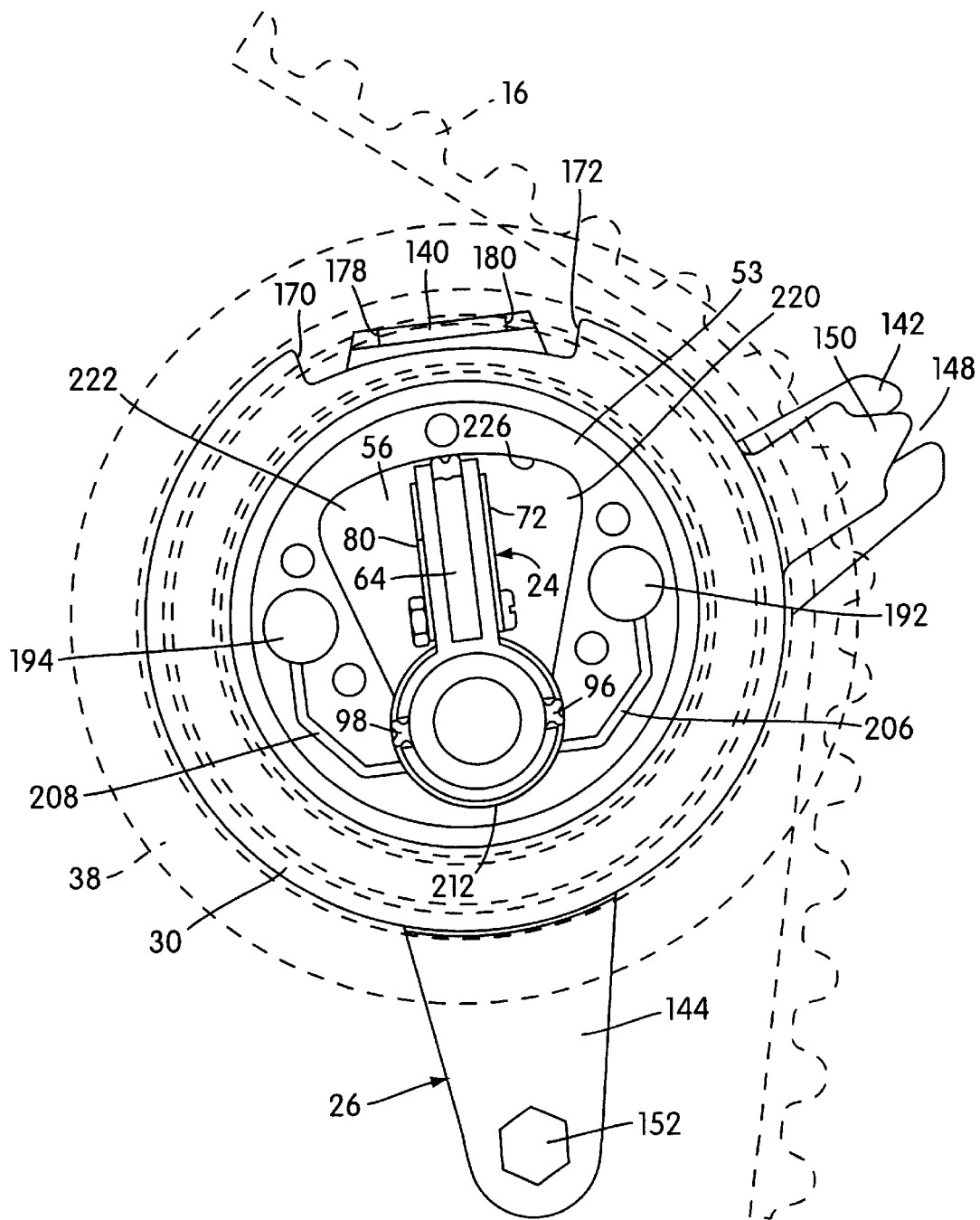
FIG. 6B is a front plan view of the belt tensioner, with various components removed to better reveal others, and showing the tensioner in an installed intermediate position in which the eccentric arm is disposed between two limit positions.

As can be appreciated from FIG. 6B, the main chamber 56 can be considered to be divided into two chamber portions, including a bump pressurized region 220 on one side of the vane structure 60 and a rebound pressurized region 222 on the opposite side of the vane structure 60. When slack exists in the belt, the bias of torsion spring 184 causes the eccentric arm 30 and entire pivoted structure to pivot in a clockwise direction with respect to the mounting bolt 22, thus causing pressurization of the rebound pressurized region 222 as will be appreciated from the configuration in FIG. 7 (of course, the tensioner could be constructed to move in the counter-clockwise direction). During this movement of the arm 30, the silicone fluid within the rebound pressurized region 222 is pressurized, causing the rebound damping flapper plate 72 to flex outwardly away from the side 74 of the vane structure 60 so as to permit fluid flow through the upper and lower passageways 66 and 70 in the vane structure 60. Fluid thus passes from the rebound pressurized region 222 to the bump pressurized region 220, with hydraulic fluid damping controlling the movement of the pivoted structure 20. Conversely, when the belt is tensioned to a relatively large extent, it forces the pivoted structure 20 away from the intermediate position illustrated in FIG. 6B, so that the arm is moved in the bump direction away from the belt as can be appreciated from the configuration illustrated in FIG. 8. In this situation, the bump pressurized region 220 is pressurized, and the pressure in the rebound pressure region 222 is lowered. As a result, fluid passes from the bump pressurized region 220 to the rebound pressurized region 222 through the middle passageway 68 as the bump damping flapper plate 80 is flexed away from the side 82 of the vane structure 60.

Stated differently, the vane structure 60 defines a pair of substantially sealed chamber portions within the fluid chamber 56 on opposing sides of the structure 60. One of these chamber portions is referred to as the bump region 220 (i.e., the region that becomes pressurized when belt tension increases) and the other chamber portion is referred to as the rebound region 222 (i.e., the region that becomes pressur-ized when the belt tension subsequently decreases). Because the belt tension changes in an oscillating manner, the pivoted structure 20 moves relative to the fixed structure in an oscillating manner. During this oscillatory movement, movement of the pivoted structure 20 repeatedly increases fluid pressure in one of the chamber portions and decreases fluid pressure in the other of the chamber portions in an alternating manner. The appropriate passageways 66, 68, 70 allow the fluid to flow from the increased pressure chamber portion to the decreased chamber portion so as to yieldingly resist the relative movement of the pivoted structure 20 and thereby dampen the relative oscillatory movement.

It is contemplated that in instances in which more tensioner force is desired (more torque provided by the arm 30), the force provided by the torsion spring 184 can be replaced or supplemented by an extension spring or compression spring connected between the eccentric tensioner arm 30 and the engine mounting surface 12 or base plate 26 to accomplish this effect. Typically the extension spring would be connected to the arm at one end, and extend beyond the outer radial extent of the pulley structure 38 for connection with the engine mounting surface 12.

During operation, movement of the tensioner is limited between two positions by engagement of the stop member 140 with the opposing stop surfaces 170 and 172 of the arm 30. More particularly, movement of the tensioner in the bump direction is limited by engagement of the edge 180 of stop member 140 with the stop surface 172 of the arm 30. Limiting movement in the bump direction prevents the tensioner from skipping a tooth on the belt 16, which could cause engine failure and damage. Movement in the rebound direction is limited by engagement of edge 178 of stop member 140 with the stop surface 170 of the arm 30.

It can be appreciated that a larger bending stiffness of the flapper plates 72 or 80 will increase the pressure required to create the necessary fluid orifice for passage of fluid. This increased restriction to flow results in an increased effective damping force. The bending stiffness of the bump damping flapper plate 80 and the bending stiffness of the rebound damping flapper plate 72 can be adjusted individually so as to independently and adjustably control the damping characteristics in the bump and rebound directions. The bending or spring stiffness of the flapper plates 72 or 80 may be increased either by increasing the thickness of the plates, increasing the number of plates used on one side of the vane structure, or changing the location of the effective bending base of the plates (i.e., changing the position at which the plates are secured by fastener members 76 and 84). Alternatively, the size of the upper and lower orifices 66 and 70 can be changed to effect the rebound damping characteristics, or the diameter of the single middle orifice 68 can be changed to alter the damping characteristics in the bump damping direction.

Because two passageways (66 and 70) permit fluid flow in the rebound direction (towards the belt) and because only a single passageway (68) permits fluid flow when the pivoted structure 20 moves in the bump direction (away from the belt), the tensioner 10 provides a much greater resistance to movement in the bump direction. In addition, it is preferred for the bump damping flapper plate 80 to be thicker than rebound damping flapper plate 72 to further provide greater resistance to tensioner movement in the bump direction. It can be appreciated that the amount of damping in each direction can be finely tuned by changing the flex or spring characteristics of the plates 72 and 80 within a predetermined damping range (e.g., by changing the thickness of the plates).

Because it is desirable for the amount of damping of tensioner movement in the bump direction (away from the belt) in comparison to the amount of damping of tensioner movement in the rebound direction (towards the belt), the plates 72 and 80 are preferably given a thickness that provides a ratio of bump damping: rebound damping of at least 4:1. In other words, the damping is such that at least four times as much belt load force is required to move the tensioner pulley member 38 a predetermined distance from the nominal (mid) position (see FIG. 6B) in the bump direction in comparison with the amount of decrease in belt load force that is required to move the tensioner pulley member 38 the same distance in from the nominal position (FIG. 6B) in the rebound direction. The aforementioned fine tuning by changing the plates 72 and 80 can be accomplished easily within the range of bump: rebound damping of between 10:1 to 1:1. Of course, higher or lower ratios may be achieved by varying the tensioner construction.

Although providing fluid passageways 66, 68, 70 in combination with flapper plates 72, 80 is a preferred construction embodying the principles of the present invention, it is contemplated that damping can be achieved using other constructions. For example, the flapper plates could be omitted and the passageways 66, 68, 70 alone could restrict fluid flow, thereby providing the appropriate damping. Also, the passageways could be omitted and the seal member 64 could be adapted to allow fluid to flow around it in a restricted manner. In fact, seal member 64 could be omitted entirely and restricted fluid flow could occur through the clearance between vane structure 60 and the housing. Further, flapper plates could be used on one side of the vane to control fluid restriction in one direction and clearance passages could be used to control restriction in the other. Thus, the vane seal structure 60 could utilize a variety of configurations and constructions to achieve the principles of the invention.

It should also be appreciated that the overall damping of the tensioner can also be controlled by changing the viscosity of the hydraulic fluid. For greater damping, a more viscous fluid may be used.

It should be appreciated that during movement of the tensioner between its two extreme positions, the sealing member 64 remains disposed in sliding sealing engagement with the interior surfaces 226 of the main chamber 56 to define the boundary between the bump and rebound pressurized regions 222, 220.

As mentioned previously, the sealing member 64 is of the quad seal type, which is hydraulically charged. This is accomplished by providing longitudinally extending U-shaped grooves 99 (see FIG. 2) facing the two pressure regions 222 and 220. When the rebound pressurized region 222 becomes pressurized, the fluid pressure against the associated facing groove causes expansion of the seal 64 to prevent fluid flow from the higher pressure region 222 to the lower pressure region. Similarly, seal 98 becomes charged so as to enhance the sealing force thereof. Also, when the bump pressurized region 220 becomes pressurized, the seal 64 and seal 96 become charged so as to increase the sealing effect provided thereby.

While the above contemplated embodiment provides a seal 64 which is bi-directionally charged (i.e., its sealing force will be enhanced by whichever pressure region 220 or 222 is higher, so as to prevent fluid flow to the lower pressure region), it is contemplated that the U-shaped groove could be provided only on the side of the seal facing the bump pressure region 220 so that the tensioner has more resistance to movement in the bump direction in comparison with the resistance to movement in the rebound direction.

It should be appreciated that the vane shaft seals 98 and 96 at all times seal the rebound pressurized region 222 and the bump pressurized region 220, respectively, from the low pressure region 212. However, during prolonged periods of operation, heat within the system may cause a gradual expansion of the silicone fluid. The vane shaft seals 96 and 98 are constructed and arranged to permit a slow leakage over time from the rebound pressurized region 222 or bump pressurized region 220 into the low pressure region 212 as a result of the thermal expansion of the silicone fluid. When the seal 96 gradually permits fluid to pass into the low pressure region 212, the fluid passes through groove 206 into the auxiliary chamber 192 and compresses the closed cell foam member 200 to provide additional volume for thermal expansion of the fluid. Similarly, when thermal expansion occurs in the rebound pressure 222 and is permitted to slowly leak pass the seal 98 into the low pressure region 212, the excess silicone fluid passes through the groove 208 into the compensating chamber 194, where the fluid compresses the closed cell foam member 202 to be stored therein until the fluid returns to temperature. When the fluid temperature is again lowered to a predetermined temperature range, fluid passes back from the chamber 192 and/or 194 into the associated bump and/or rebound pressurized regions 220, as facilitated by the resilience of closed cell foam members 200, 202.

The closed cell foam effectively simulates a compressible fluid. The closed cell foam retains its air porosity when submerged in the silicone fluid. As the fluid expands with increasing temperature it compresses the foam and occupies the volume thus vacated. By compensating for the change in volume of the hydraulic fluid, the device is never overpressurized and thus can effectively be sealed from the environment.

Other compressible structure may be used in place of the closed cell foam. For example, a compressible air balloon may be used to compensate for thermal expansion. Also, a rigid piston sealing mounted in the chamber 192,194 with a sealed cushion of air disposed under the piston may also be used.

The use of silicone hydraulic fluid in the damper minimizes variations in fluid viscosity with temperature. The relative insensitivity of the hydraulic fluid to temperature results in more consistent performances throughout the operating temperature range.

In accordance with the invention, it can be appreciated that because the hydraulic fluid chamber 56 is disposed within the eccentric tensioner arm 30, within the circumference defined by the ball bearing assembly 32, the entire tensioner 10 can be made small. By providing a valve structure in the form of a single vane, the valve structure 24 is also small. In addition, the fact that the sector shaped chamber 56 need not extend completely around the pivot axis defined by bolt 22 also makes the entire tensioner 10 small. Preferably, the chamber 56 forms a general sector shape that is between approximately 30°–40° of a circle, and most preferably 35° of a circle. It is also preferred that the arm have a pivotal range of movement between the first and second positions defined by stop surfaces 179, 172 between about 18°–30° with respect to the pivot axis, and most preferably between about 20°–25°.

The present invention provides a belt tensioner that increases the amount of damping force applied as the oscillation frequency of the tensioner increases, and which applies less damping force at lower frequencies. More particularly, at higher oscillation frequencies of tensioner movement, more fluid displacement through vane structure 60 occurs per unit time, and at lower frequencies there is less fluid displacement per unit time. With increasing fluid displacement, there is a corresponding increase in energy absorbed by the tensioner from the belt system. Thus, it can be appreciated that in accordance with the present invention, the amount of damping is highly velocity dependent. This is advantageous because more damping is needed at higher speeds of tensioner oscillation.

The hydraulic fluid in chamber 56 may be a conventional substantially incompressible fluid, such as oil. The fluid may also be an electro-rheological fluid or a magneto-rheological fluid. Each of these fluids are capable of changing viscosity, and thus varying damping, when an electric or magnetic field is applied to the tensioner, thus providing a "smart" tensioner whose damping characteristics are dependent upon an input signal. The input can be generated by different types of sensors mounted on the tensioner itself (i.e., position sensor, accelerometer) or on the engine (i.e., engine load, torque speed from the engine computer).

It can also be appreciated that the hydraulic valving assembly 24 of the present invention permits oscillatory movement of the tensioner at all speeds to continuously remove energy from the drive system. Because the damping is highly dependent on velocity as previously described, the movement of the tensioner is much greater at resonance than at off-resonance frequencies. At resonance, the tensioner moves within a range of motion of approximately 3–4°. Nearly critical damping is achieved at all speeds.

It is to be understood that the foregoing specific embodiment has been provided to illustrate the structural and functional principles of the present invention and is not intended to be limiting. To the contrary, the present invention is intended to encompass any alterations, or modifications or alterations within the scope of the appended claims.

It should be noted the claim language in the "means or step for performing a specified function" format of 35 U.S.C. §112, ¶6 has been omitted from the appended claims. This has been done to clearly point out the appended claims are not intended to be interpreted under §112, ¶6 so as to be limited solely to the structures disclosed in the specification and their equivalents.

What is claimed is:

1. A tensioner for use in an engine, said tensioner comprising:

a fixed structure constructed and arranged to be fixed to the engine;

a movable structure mounted for movement relative to said fixed structure in a tension applying direction and an opposite direction opposite said tension applying direction;

a rotatable member rotatably mounted on said movable structure, said rotatable member having a driving element engaging surface positioned and configured to be engaged with an endless driving element such that engine driven movement of the driving element rotates said rotatable member;

one of said fixed structure and said movable structure having an interior surface defining a fluid chamber containing substantially incompressible fluid;

the other of said fixed structure and said movable structure including a chamber dividing structure disposed within said fluid chamber, said chamber dividing structure cooperating with the interior surface defining said fluid chamber so as to define first and second chamber portions within said fluid chamber on opposing sides of said chamber dividing structure, said chamber dividing structure having a fluid passageway formed therethrough to enable fluid communication between said first and second chamber portions;

a resiliently flexible member mounted to said chamber dividing structure in covering relation with respect to said fluid passageway, said flexible member being movable away from said fluid passageway to enable said fluid to flow between said first and second chamber portions;

a biasing element engaged with said movable structure, said biasing element applying a biasing force to bias said movable structure in said tension applying direction to tension the endless driving element;

said fixed structure, said movable structure, and said biasing element being constructed and arranged such that, when the driving element engaging surface of said rotatable member is engaged with the endless driving element as aforesaid and said endless driving element is subject to an increase in tension and then a subsequent decrease in tension, the increase in the tension of said driving element moves said movable structure relative to said fixed structure in said opposite direction thereof against the biasing force of said biasing element to compensate for the increase in tension and then said biasing element responsively moves said movable structure relative to said fixed structure in the tension applying direction thereof to compensate for the subsequent decrease in the tension of said driving element and maintain the driving element engaging surface of said rotatable member in engagement with said endless driving element;

said chamber dividing structure being constructed and arranged such that (a) the relative movement of said movable structure in said tension applying direction increases fluid pressure in said first chamber portion and decreases fluid pressure in said second chamber portion so as to displace fluid from said first chamber portion to said second chamber portion, and (b) relative movement of said movable structure in said opposite direction increases fluid pressure in said second chamber portion and decreases fluid pressure in said first chamber portion so as to displace fluid from said second chamber portion to said first chamber portion, said chamber dividing structure being configured to allow the fluid to flow between said chamber portions in a restricted manner so as to yieldingly resist the relative movement of said movable structure and thereby dampen the relative movement of said movable structure;

said resiliently flexible member covering said fluid passageway so as to prevent said fluid from flowing from said second chamber portion to said first chamber portion through said fluid passageway as said movable structure moves in said opposite direction and so as to flex away from and uncover said fluid passageway and allow said fluid to flow from said first chamber portion to said second chamber portion as said movable structure moves in said tension applying direction such that the fluid flow restriction is greater when said movable structure moves in said opposite direction than when said movable structure moves in the tension applying direction so that, when the driving element engaging surface of said rotatable member is engaged with the endless driving element and the driving element is subject to the increase in tension and then the subsequent decrease in tension as aforesaid, the yielding resistance to the relative movement of said movable structure provided by the fluid flow restriction is greater in the opposite direction than in the tension applying direction.

2. A tensioner according to claim 1, wherein said one of said fixed structure and said movable structure that has said interior surface defining said fluid chamber is said movable structure and said the other of said fixed structure and said movable structure that includes said chamber dividing structure is said fixed structure.

3. A tensioner according to claim 2, wherein said movable structure is a pivoted structure mounted for pivoting movement relative to said fixed structure.

4. A tensioner according to claim 3, wherein said chamber dividing structure has a plurality of said fluid passageways each formed therethrough to enable fluid communication between said first and second chamber portions.

5. A tensioner according to claim 4, further comprising a plurality of resiliently flexible members each mounted to said chamber dividing structure in covering relation with respect to an associated one of said fluid passageways;
   a number of said resiliently flexible members being mounted on one opposing side of said chamber dividing structure so as to be disposed in said first chamber portion and a remainder of said resiliently flexible members being mounted on the other opposing side of said chamber dividing structure so as to be disposed in said second chamber portion;
   said resiliently flexible members being positioned and configured such that (1) increased fluid pressure in said first chamber portion moves the resiliently flexible members disposed in said second chamber portion away from and uncovers the passageways associated therewith so as to allow the fluid to flow from the first chamber portion to the second chamber portion through the associated passageways and (2) increased fluid pressure in said second chamber portion moves the resiliently flexible members disposed in said first chamber portion away from and uncovers the passageways associated therewith so as to allow the fluid to flow from the second chamber portion to the first chamber portion through the associated passageways.

6. A tensioner according to claim 5, wherein the remainder of said resiliently flexible members disposed in said second chamber portion outnumbers the number of said resiliently flexible members disposed in said first chamber portion so that the fluid flow restriction is greater when said movable structure moves in the opposite direction than when said movable structure moves in the tension applying, thereby providing said movable structure with greater resistance to movement in said opposite direction than in said tensioning direction.

7. A tensioner according to claim 5, wherein each of said resiliently flexible members has a bending stiffness, the bending stiffness of the resiliently flexible members disposed in said first chamber portion being greater than the bending stiffness of the resiliently flexible members disposed in said second chamber portion so that the fluid flow restriction is greater when said movable structure moves in the opposite direction than when said movable structure moves in the tension applying direction, thereby providing said movable structure with greater resistance to movement in said opposite direction than in said tensioning direction.

8. A tensioner according to claim 5, wherein said chamber dividing structure further comprises a pair of resilient sealing members sealingly engaged with the interior surface of said chamber so as to define a low pressure chamber portion between said first and second chamber portions;
   said fixed structure further comprising surfaces defining a volume compensation chamber communicated to said low pressure portion and having resiliently compressible structure disposed in said chamber;
   said resilient seal members being adapted to allow the substantially incompressible fluid to flow from said first and second chamber portions to said low pressure chamber portion when the fluid pressure in said chamber increases as a result of increased temperature such that the fluid can thereafter flow into said compensation chamber and compress the resiliently compressible structure so as to volumetrically expand said compensation chamber and compensate for the increased fluid pressure.

9. A tensioner according to claim 8, wherein said fixed structure has a pair of said volume compensation chambers each containing said resiliently compressible material.

10. A tensioner according to claim 9, wherein said fixed structure has a pair of grooves communicating said compensation chambers to said low pressure chamber portion.

11. A tensioner according to claim 9, wherein said chamber dividing structure further comprises a resilient sealing member engaged in slidably sealed relation with said interior surface defining said fluid chamber.

12. A tensioner according to claim 11, wherein said movable structure includes an eccentric tensioner arm, said rotatable member being rotatably mounted to said tensioner arm and having a rotational axis offset from the pivotal axis of said movable structure.

13. A tensioner according to claim 12, wherein said movable structure includes a ball bearing assembly mounted on said tensioner arm, said rotatable member being rotatably mounted to said ball bearing assembly.

14. A tensioner according to claim 13, further comprising a bolt mounting said movable structure to said fixed structure and being configured to mount said tensioner to a tensioner mounting surface.

15. A tensioner according to claim 13, wherein said biasing element is a tension spring mounted to said fixed structure.

16. A tensioner according to claim 15, wherein tension arm has a housing portion and a closure portion, said housing portion and said closure portion cooperating to provide the interior surface defining said fluid chamber.

17. A tensioner according to claim 15, wherein said fixed structure includes a base plate, said chamber dividing structure being fixedly mounted to said base plate and said biasing element being mounted to said base plate.

18. A tensioner according to claim 17, wherein said base plate has an indicator member extending radially outwardly therefrom and said tensioner arm has a pointer extending radially outwardly therefrom;
   said tensioner being installed onto the engine by loosely securing said bolt to the engine, loosely engaging the driving element with said rotatable member, moving said base plate and movable structure together about said bolt until the movable structure and the driving element are tightly engaged with the driving element being tensioned, then subsequently moving said base plate and said chamber dividing structure against the biasing force of said biasing element relative to said movable structure until said indicator member and said pointer are aligned with one another, and thereafter tightening said bolt so as to fix said chamber dividing structure and said base plate to engine.

19. A tensioner according to claim 1, wherein said chamber dividing structure is a vane structure.

20. A tensioner for use in an engine, said tensioner comprising:

a fixed structure constructed and arranged to be fixed to the engine;

a movable structure mounted for movement relative to said fixed structure in a tension applying direction and an opposite direction;

a rotatable member rotatably mounted on said movable structure, said rotatable member having a driving element engaging surface positioned and configured to be engaged with the driving element such that movement of the driving element rotates said pulley member;

one of said fixed structure and said movable structure having an interior surface defining a fluid chamber containing substantially incompressible fluid;

the other of said fixed structure and said movable structure including a chamber dividing structure disposed within said fluid chamber, said chamber dividing structure cooperating with the interior surface defining said fluid chamber so as to define a first and second chamber portions within said fluid chamber on opposing sides of said chamber dividing structure;

a biasing element engaged with said movable structure, said biasing element applying a biasing force to bias said movable structure in said tension applying direction so as to tension the driving element;

said chamber dividing structure being constructed and arranged such that the relative movement of said movable structure in said tension applying direction increases fluid pressure in said first chamber portion and decreases fluid pressure in said second chamber portion so as to displace fluid from said first chamber portion to said second chamber portion and relative movement of said movable structure in said opposite direction increases fluid pressure in said second chamber portion and decreases fluid pressure in said first chamber portion so as to displace fluid from said second chamber portion to said first chamber portion, said chamber dividing structure being configured to allow the fluid to flow between said chamber portions in a restricted manner so as to yieldingly resist the relative movement of said movable structure and thereby dampen the relative movement of said movable structure;

structure providing a surface defining a volume compensation chamber [communicated to said fluid chamber;

structure providing a surface defining a low pressure fluid chamber fluidly communicated with said chamber portions and said volume compensation chamber;

sealing structure disposed between said low pressure fluid chamber and said chamber portions, said sealing structure being adapted to allow said fluid to flow from said chamber portions to said low pressure chamber when the fluid pressure in said first and second chamber portions increases as a result of increased temperature so that the fluid can thereafter flow into said compensation chamber, said sealing structure substantially preventing fluid from flowing from said chamber portions to said low pressure chamber due to a transient fluid pressure increase during tensioner operation;

a resiliently compressible structure disposed inside said compensation chamber;

said compressible structure being compressible under fluid pressure such that the fluid flowing into said compensation chamber from said low pressure chamber due to the fluid pressure in said first and second chamber portions increasing as a result of said increased temperature compresses the resiliently compressible structure so as to volumetrically expand the compensation chamber and compensate for the increased fluid pressure.

21. A tensioner according to claim 20, wherein said sealing structure comprises a pair of resilient sealing members sealingly engaged with the interior surface of said chamber so as to define said low pressure chamber between said first and second chamber portions;

said resilient seal members being adapted to allow the substantially incompressible fluid to flow from said first and second chamber portions to said low pressure chamber when the fluid pressure in said chamber increases as a result of increased temperature such that the fluid thereafter flows into said compensation chamber and compress the resiliently compressible structure so as to volumetrically expand said compensation chamber and compensate for the increased fluid pressure.

22. A tensioner according to claim 21, wherein said fixed structure has a second surface defining a second volume compensation chamber in communication with said low pressure chamber and a second resiliently compressible structure disposed inside said second compensation chamber.

23. A tensioner according to claim 22, wherein said fixed structure has a pair of grooves communicating said compensation chambers to said low pressure chamber.

24. A tensioner according to claim 20, wherein said chamber dividing structure is sealingly engaged with the interior surface defining said fluid chamber.

25. A tensioner according to claim 20, wherein said one of said fixed structure and said movable structure is said movable structure and the other of said fixed structure and said movable structure is said fixed structure.

26. A tensioner according to claim 25, wherein said movable structure is a pivoted structure mounted for pivoting movement relative to said fixed structure.

27. A tensioner according to claim 26, wherein said chamber dividing structure has a plurality of fluid passageways formed therethrough;

said chamber dividing structure being configured to allow the fluid to flow from between said chamber portions through said passageways.

28. A tensioner according to claim 27, wherein said chamber dividing structure comprises a plurality of resilient flapper plates positioned so as to close said fluid passageways;

a number of said flapper plates being mounted on one opposing side of said chamber dividing structure so as to be disposed in said first chamber portion and the remainder of said flapper plates being mounted on the other opposing side of said chamber dividing structure so as to be disposed in said second chamber portion;

said flapper plates being positioned and configured such that (1) increased fluid pressure in said first chamber portion moves the flapper plates disposed in said second chamber portion away from the passageways associated therewith so as to allow the fluid to flow through the associated passageways and (2) increased fluid pressure in said second chamber portion moves the flapper plates disposed in said first chamber portion away from the passageways associated therewith so as to allow the fluid to flow through the associated passageways.

29. A tensioner according to claim 26, wherein said movable structure includes a tensioner arm, said rotatable member being rotatably mounted to said tensioner arm and having a rotational axis offset from the pivotal axis of said movable structure.

30. A tensioner according to claim 29, wherein said movable structure includes a ball bearing assembly mounted on said tensioner arm, said rotatable member being rotatably mounted to said ball bearing assembly.

31. A tensioner according to claim 30, further comprising a bolt mounting said movable structure to said fixed structure and being configured to mount said tensioner to engine.

32. A tensioner according to claim 31, wherein said biasing element is a tension spring mounted to said fixed structure.

33. A tensioner according to claim 32, wherein tension arm has a housing portion and a closure portion, said housing portion and said closure portion cooperating to provide the interior surface defining said fluid chamber.

34. A tensioner according to claim 32, wherein said fixed structure includes a base plate, said chamber dividing structure being fixedly mounted to said base plate and said biasing element being mounted to said base plate.

35. A tensioner according to claim 34, wherein said base plate has an indicator member extending radially outwardly therefrom and said tensioner arm has a pointer extending radially outwardly therefrom;

said tensioner being installed onto the engine by loosely securing said bolt to said engine, loosely engaging the driving element with said rotatable member, moving said base plate and movable structure together about said bolt until the movable structure and the driving element are tightly engaged with the driving element being tensioned, then subsequently moving said base plate and said chamber dividing structure against the biasing force of said biasing element relative to said movable structure until said indicator member and said pointer are aligned with one another, and thereafter tightening said bolt so as to fix said chamber dividing structure and said base plate to said engine.

36. A tensioner according to claim 25, wherein said chamber dividing structure is constructed and arranged such that the fluid flow restriction is greater when said movable structure moves in said opposite direction than when said movable structure moves in the tension applying direction, thereby providing said movable structure with greater resistance to movement in said opposite direction than in said tensioning direction.

37. A tensioner according to claim 36, wherein said movable structure is a pivoted structure mounted for pivoting movement relative to said fixed structure.

38. A tensioner according to claim 37, wherein said chamber dividing structure has a plurality of fluid passageways formed therethrough;

said chamber dividing structure being configured to allow the fluid to flow from between said chamber portions through said passageways.

39. A tensioner according to claim 38, wherein said chamber dividing structure comprises a plurality of resilient flapper plates positioned so as to close said fluid passageways;

a number of said flapper plates being mounted on one opposing side of said chamber dividing structure so as to be disposed in said first chamber portion and the remainder of said flapper plates being mounted on the other opposing side of said chamber dividing structure so as to be disposed in said second chamber portion;

said flapper plates being positioned and configured such that (1) increased fluid pressure in said first chamber portion moves the flapper plates disposed in said second chamber portion away from the passageways associated therewith so as to allow the fluid to flow through the associated passageways and (2) increased fluid pressure in said second chamber portion moves the flapper plates disposed in said first chamber portion away from the passageways associated therewith so as to allow the fluid to flow through the associated passageways.

40. A tensioner according to claim 39, wherein the flapper plates disposed in said second chamber portion outnumber the flapper plates disposed in said first chamber portion so that the fluid flow restriction is greater when said movable structure moves in the opposite direction than when said movable structure moves in the tension applying direction, thereby providing said movable structure with greater resistance to movement in said opposite direction than in said tension applying direction.

41. A tensioner according to claim 39, wherein each of said flapper plates has a bending stiffness, the bending stiffness of the flapper plates disposed in said first chamber portion being greater than the flapper plates disposed in said second chamber portion so that the fluid flow restriction is greater when said movable structure moves in the opposite direction than when said movable structure moves in the tension applying direction, thereby providing said movable structure with greater resistance to movement in said opposite direction than in said tension applying direction.

42. A tensioner according to claim 38, wherein said movable structure includes a tensioner arm, said rotatable member being rotatably mounted to said tensioner arm and having a rotational axis offset from the pivotal axis of said movable structure.

43. A tensioner according to claim 42, wherein said movable structure includes a ball bearing assembly mounted on said tensioner arm, said rotatable member being rotatably mounted to said ball bearing assembly.

44. A tensioner according to claim 43, further comprising a bolt mounting said movable structure to said fixed structure and being configured to mount said tensioner to the engine.

45. A tensioner according to claim 44, wherein said biasing element is a tension spring mounted to said fixed structure.

46. A tensioner according to claim 45, wherein tension arm has a housing portion and a closure portion, said housing portion and said closure portion cooperating to provide the interior surface defining said fluid chamber.

47. A tensioner according to claim 46, wherein said fixed structure includes a base plate, said chamber dividing structure being fixedly mounted to said base plate and said biasing element being mounted to said base plate.

48. A tensioner according to claim 47, wherein said base plate has an indicator member extending radially outwardly therefrom and said tensioner arm has a pointer extending radially outwardly therefrom;

said tensioner being installed onto the engine by loosely securing said bolt to said engine, loosely engaging the driving element with said rotatable member, moving said base plate and movable structure together about said bolt until said movable structure and the driving element are tightly engaged with the driving element being tensioned, then subsequently moving said base plate and said chamber dividing structure against the biasing force of said biasing element relative to said movable structure until said indicator member and said pointer are aligned with one another, and thereafter tightening said bolt so as to fix said chamber dividing structure and said base plate to engine.

* * * * *